UNITED STATES PATENT OFFICE.

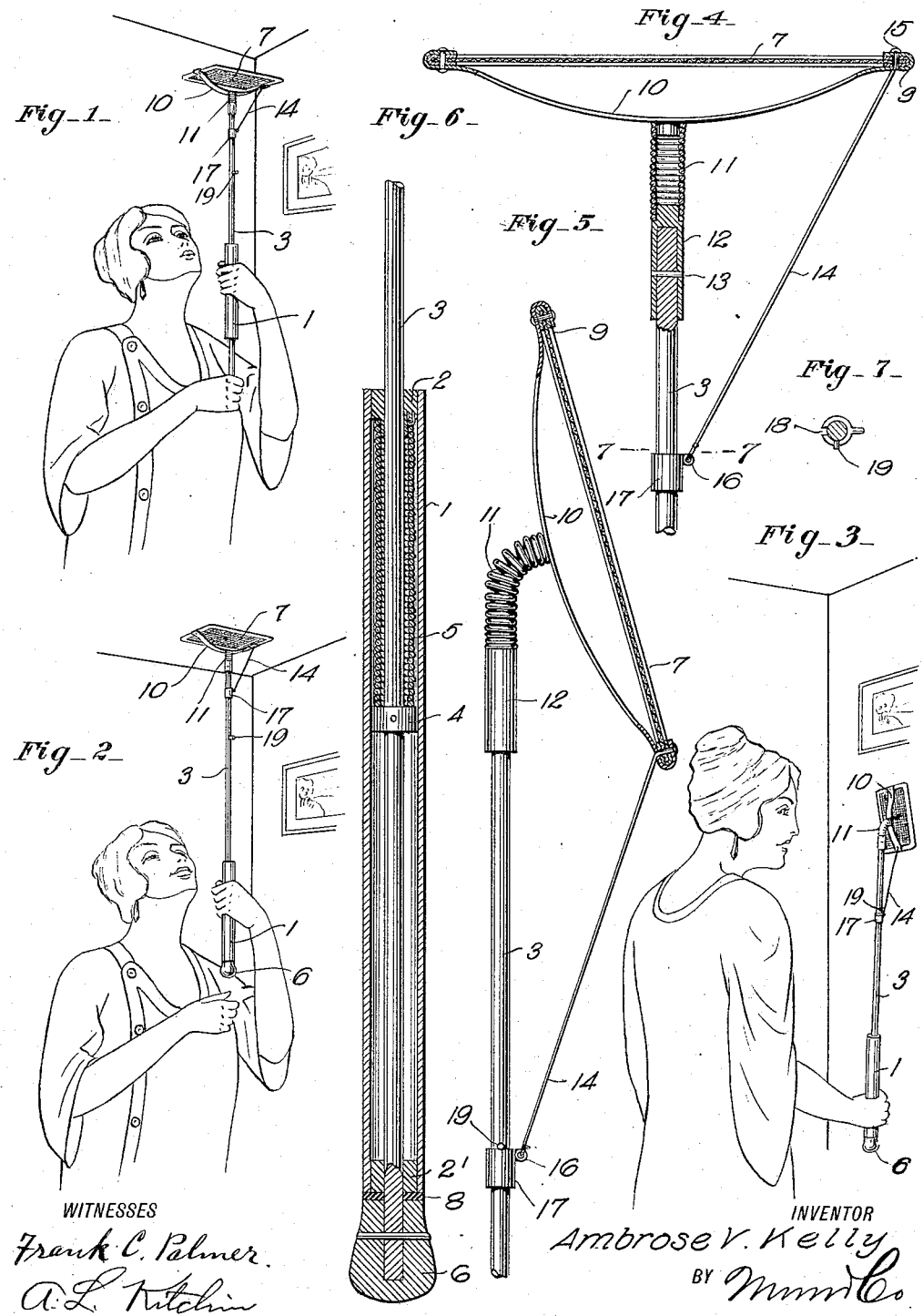

AMBROSE VINCENT KELLY, OF NEW YORK, N. Y.

ADJUSTABLE SWATTER.

1,174,733.                 Specification of Letters Patent.      Patented Mar. 7, 1916.

Application filed October 27, 1915.   Serial No. 58,154.

*To all whom it may concern:*

Be it known that I, AMBROSE V. KELLY, a citizen of the United States, and a resident of the city of New York, borough of Brooklyn, in the county of Kings and State of New York, have invented a new and Improved Adjustable Swatter, of which the following is a full, clear, and exact description.

This invention relates to what are termed swatters and particularly to an adjustable swatter designed for use in killing flies, mosquitos and the like either on the ceiling of a room or on the walls.

The object in view is to provide an adjustable structure which, when used on the ceiling, will strike the same in a flat condition or when used on a wall will strike the wall in a flat condition and thereby kill the fly or mosquito without injuring the wall.

Another object in view is to provide an improved arrangement of swatting device wherein the contact member is resiliently supported either in a position substantially parallel with the supporting rod or in a position substantially at right angles thereto so as to be freely used on any desired surface.

A still further object in view is to provide a swatting device which may have the contact part projected a short distance without entirely leaving the hand of the operator, whereby the contact member is caused to quickly strike.

In the accompanying drawing: Figure 1 is a perspective view showing an embodiment of the invention in an operative position; Fig. 2 is a view similar to Fig. 1 but showing the device in its projected or operated position; Fig. 3 is a view similar to Fig. 2 but disclosing the device in a further adjusted position; Fig. 4 is a longitudinal vertical section through the upper part of the device, the same being on an enlarged scale; Fig. 5 is a view similar to Fig. 4 but with the parts shown in an adjusted position; Fig. 6 is an enlarged vertical section through the lower part of the handle of the device, disclosing certain features of the invention; Fig. 7 is a detail fragmentary sectional view through Fig. 4 on line 7—7.

Referring to the accompanying drawing by numerals, 1 indicates a handle which is hollow and which is provided with a plug or filling member 2 having an aperture through which the reciprocating stem 3 passes. The stem 3 has a stop 4 connected therewith in any suitable manner so that the spring 5 may act on stop 4 and on the plug 2 for projecting the stem 3 upwardly, or from the position shown in Fig. 1 to the position shown in Fig. 2. It will be observed that the spring 5 is arranged as a retractile spring, but if desired it could be arranged to expand when the device is to be projected. A knob 6 is rigidly secured to the other end of the stem 3 so that the stem may be readily pulled downwardly to the position shown in Fig. 1 in order to bring the spring 5 under tension. When the knob 6 is released the same quickly moves upwardly to the position shown in Fig. 2 and causes the contact member 7 to strike the ceiling or other object as well as the fly or mosquito. A resilient washer 8 is provided at the lower end of the handle 1 for cushioning the blow unless the contact member 7 and associated parts stop the movement of the knob 6 before it reaches the handle 1. From Fig. 6 it will be noticed that there is a second plug 2' which, together with plug 2, acts as a guide for the stem 3 in its movements.

The contact member 7 may be made from wire mesh or other suitable material and is provided with a binding 9 of cloth or other suitable material whereby the contact member will not scratch an article when the same is engaged thereby. A flat spring 10 is folded at the ends around the edges of member 7 and held in place in any suitable manner, as for instance, by being pinched in place or by having rivets extending through the parts. Secured to the center of spring 10 is a coiled spring 11 the securing being rigid so that the spring 10 and associated parts may be turned to the position shown in Fig. 5 whenever desired. Spring 11 is also rigidly secured to a sleeve 12 which is connected to the stem 3 by any suitable means, as for instance, pin 13. By providing the spring 10 and also the coiled spring 11, when the contact member 7 is projected as shown in Figs. 1 and 2, the same may strike the ceiling and then spring back.

In operation, preferably the device is used at such a distance from the ceiling as to cause the knob 6 to strike the cushioning washer 8 immediately before the contact member 7 engages the ceiling, whereby the springs 10 and 11 must be slightly stretched in order to cause the striking action, said stretching being through the action of momentum. This causes the striking member to strike the ceiling and then quickly move away. Of course the device may be held closer to the ceiling or other object when it is desired to give a stronger blow.

When it is desired to strike the wall or some vertical surface the parts are moved to the position shown in Figs. 3 and 5. In order to provide for this movement a cord or other suitable connecting member 14 is secured to one edge of the member 7 in any suitable manner, as for instance, by being passed therethrough as shown in Fig. 4 and provided with a knot or enlargement 15. The end opposite the knot or enlargement 15 is connected to the eyelet 16 projected from sleeve 17. Sleeve 17 is provided with a slot 18 so that the sleeve may be moved down to pin 19 and turned so as to slide thereover, after which it is adjusted to the position shown in Fig. 5. This will hold the contact member 7 in an almost vertical position when the stem 3 is in a vertical position. When the parts are arranged in this way a person may easily strike the wall at any desired point by a swinging blow and cause the contact member to engage the wall flatwise by reason of the slight angle that must necessarily be given to the stem 3 in order to prevent the hand from engaging the wall. By providing the construction described the device may be readily adjusted from a position which allows the device to be used as a projecting device to a device which may be used to give a swinging blow.

What I claim is:

1. A swatter, comprising a contact member, a stem, means connecting the contact member with said stem, said means including a coiled spring, a flexible member connected with said contact member for moving the same to a position substantially parallel with the stem, and locking means associated with said flexible member for locking the same in an adjusted position.

2. A swatter, comprising a contact member, a bowed spring connected at the ends to said contact member, a spiral spring connected at one end to substantially the central point of said bowed spring, a stem connected to the opposite end of said spiral spring, a flexible member connected with said contact member, a stop mounted on said stem, and means for connecting said flexible member with said stop when it is desired to hold the contact member substantially parallel with the stem.

3. A swatter, comprising a contact member, a stem, resilient means connecting the contact member and stem and arranged to normally hold the contact member in a plane at right angles to the plane of the stem, a pin arranged on the stem, a sliding sleeve formed with a slot arranged on the stem adapted to be passed over said pin and then turned to a different position, said slot accommodating the movement of the sleeve, and means for connecting the sleeve with the contact member so that when the sleeve is in engagement with said pin the contact member will be moved to one side and will be approximately in a plane parallel to the plane of the stem.

4. A swatter of the character described, comprising a contact member, a supporting stem, a helical spring for connecting said contact member with said stem so that the contact member will normally maintain a position at right angles to the stem, and a movable adjusting member connected to one side of said contact member for swinging the contact member to a position substantially parallel with said stem, whereby the contact member may be used on a horizontal surface or a vertical surface while the operator remains in a given position, and a catch device on said stem for locking said movable adjusting member against a return movement when adjusted for holding the contact member substantially parallel with said stem.

5. A swatter comprising a contact member, a bowed spring having the opposite ends connected to the opposite sides of said contact member, a helical spring connected substantially centrally of said bowed spring, a stem connected with said helical spring, the use of said helical spring permitting said contact member to be moved from a position substantially at right angles to the stem so as to occupy a position substantially parallel to said stem, an adjusting member connected to the outer part of said contact member, a sleeve connected to the inner end of said adjusting member, said sleeve surrounding said stem, and means on the stem for locking the sleeve in its adjusted position whereby the contact member is held substantially parallel with the stem.

In testimony whereof I have signed my name to this specification in the presence of two subscribing witnesses.

AMBROSE VINCENT KELLY.

Witnesses:
ALBERT B. CORY,
ROBERT M. CONE.

Copies of this patent may be obtained for five cents each, by addressing the "Commissioner of Patents, Washington, D. C."